(12) United States Patent
Soliman

(10) Patent No.: US 8,364,166 B2
(45) Date of Patent: Jan. 29, 2013

(54) SYSTEM AND METHOD OF POSITION LOCATION TRANSFER

(75) Inventor: Samir S. Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1222 days.

(21) Appl. No.: 12/106,841

(22) Filed: Apr. 21, 2008

(65) Prior Publication Data

US 2009/0264137 A1 Oct. 22, 2009

(51) Int. Cl.
*H04W 24/00* (2009.01)
*G01S 3/16* (2006.01)
*G01S 3/02* (2006.01)

(52) U.S. Cl. .......... 455/456.1; 455/456.6; 342/450; 342/378

(58) Field of Classification Search ............. 455/456.1
See application file for complete search history.

(56) References Cited

U.S. PATENT DOCUMENTS

| | | | |
|---|---|---|---|
| 6,473,038 B2 * | 10/2002 | Patwari et al. ............. | 342/450 |
| 7,084,809 B2 | 8/2006 | Hockley, Jr. et al. | |
| 7,274,940 B2 | 9/2007 | Kyperountas et al. | |
| 2005/0143100 A1 * | 6/2005 | Shi et al. .................. | 455/456.6 |
| 2005/0143101 A1 * | 6/2005 | Kyperountas et al. ...... | 455/456.6 |
| 2009/0243932 A1 * | 10/2009 | Moshfeghi .................. | 342/378 |

FOREIGN PATENT DOCUMENTS

WO WO2007133264 A2 11/2007

OTHER PUBLICATIONS

Agre et al., "A Layered Architecture for Location-Based Services in Wireless Ad Hoc Networks," Proceedings of IEEE Aerospace Conference, vol. 3, Mar. 2002, pp. 3-1085-3-1097.
Kotanen et al., "Positioning with IEEE 802.11b Wireless LAN," IEEE Conference Proceedings on Personal, Indoor and Mobile Radio Communications, vol. 3, Sep. 2003, pp. 2218-2222.
Montillet et al., "Comparison of UWB and WCDMA Positioning Accuracies," IEEE 61st Vehicular Technology Conference, vol. 4, Jun. 2005, pp. 2260-2263.
Pahlavan et al., "An Overview of Wireless Indoor Geolocation Techniques and Systems," Proceedings of IEEE Mobile Wireless Communication Networks 2000, May 2000.
Shimizu et al., "Novel Positioning System with Extremely Low Power Radio," IEEE Conference on Ultrawideband Systems and Technologies, May 2004, pp. 391-394.

(Continued)

*Primary Examiner* — Patrick N. Edouard
*Assistant Examiner* — Timothy Pham
(74) *Attorney, Agent, or Firm* — Linda G. Gunderson

(57) ABSTRACT

A position location system, apparatus and method are disclosed. A coordinating device identifies a group of wireless devices for position location processing. The number of wireless devices in the group may vary according to the number of coordinates used to define a position within the system. The coordinating device obtains range measurements from which a distance between each pair of wireless devices in the group can be determined. In addition, the coordinating device acquires the known position of one wireless device in the group. Using this information, a position is determined for one or more devices in the group for which position data is not available. Optionally, the position data is validated by the coordinating device or another wireless device in the system and a final position is returned to the one or more wireless devices.

32 Claims, 6 Drawing Sheets

OTHER PUBLICATIONS

Soliman et al., "Geolocation Technologies and Applications for Third Generation Wireless," Wiley InterScience Wireless Communications and Mobile Computing, vol. 2, No. 3. May 2002, pp. 229-251.

Yu et al., "Performance of UWB Position Estimation Based on Time-of-Arrival Measurements," IEEE Conference on Ultrawideband Systems and Technologies, May 2004, pp. 400-404.

Yu et al., "UWB Positioning for Wireless Embedded Networks," IEEE Radio and Wireless Conference, Sep. 2004, pp. 459-462.

International Search Report and Written Opinion—PCT/US2009/041303, International Search Authority—European Patent Office—Aug. 27, 2009.

* cited by examiner

SYSTEM AND METHOD OF POSITION LOCATION TRANSFER

BACKGROUND

This disclosure relates generally to electronic communications and, more particularly, to a wireless position location and transfer system.

In many applications it is advantageous to have the ability to determine a position of a mobile device. Position location may be helpful for navigation, tracking, or location based services. Regulatory mandates and advances in the performance of portable electronics, particularly advances in the performance of processors, have added to the demand for using position location with a variety of wireless devices.

As just one example, it may be desirable to know the position of a wireless device within a building or other structure. In cases of emergency, the location of a cellular phone may be used to direct police, firefighters, or paramedics to where they are needed with a high level of accuracy. This is the aim of the E911 system as mandated in the United States by the Federal Communications Commission (FCC).

Unfortunately, position location is not universally available. Often, in a group of wireless devices, there are some devices which know their position and some devices which do not. Position-unaware devices may lack the necessary hardware, or they may be unable to obtain a fix of their position due to an insufficient satellite visibility. In some cases, wireless devices are moved from place to place and must be reprogrammed at each new location in order to remain up-to-date. Whatever the source, these deficiencies reduce the usefulness of wireless devices.

Therefore, it is desirable to have a position location system, method, and apparatus that enable position location for groups of wireless devices some of which may not have a built-in position location capability.

BRIEF SUMMARY

A position location system, apparatus and method are disclosed. A coordinating device identifies a group of wireless devices for position location processing. The number of wireless devices in the group may vary according to the number of coordinates used to define a position within the system. The coordinating device obtains range measurements from which a distance between each pair of wireless devices in the group can be determined. In addition, the coordinating device acquires the known position of one wireless device in the group. Using this information, a position is determined for one or more devices in the group for which position data is not available. Optionally, the position data is validated by the coordinating device or another wireless device in the system and a final position is returned to the one or more wireless devices. In some embodiments, instead of a coordinating device returning position data to other devices, each wireless device defines its own positioning group and determines its own position based upon data obtained therefrom.

In one embodiment, a position location apparatus is disclosed. The apparatus includes a group identification module for defining, a group of at least four wireless devices. The group of wireless devices has a first wireless device for which a position is available and second wireless devices for which positions are not available. The apparatus also includes a data acquisition module for obtaining range measurements for each pair of wireless devices in the group of wireless devices and obtaining the position of the first wireless device. The apparatus further includes a positioning module for determining a position of at least one of the second wireless devices using the range measurements and the position of the first wireless device.

In one embodiment, the apparatus includes a position transfer module for sending to each of the second wireless devices in the group of wireless devices the position determined for that wireless device. The apparatus may also include a position arbiter module for selecting a position of the at least one wireless device from among a set of positions determined by the positioning module. The position of the at least one wireless device can be a coordinate pair. It can also be a point in three dimensional space for a group that includes at least six wireless devices. Also, the range measurements can include round-trip travel times for signals exchanged by each pair of wireless devices. In some embodiments, the positioning module calculates one-way time-of-flight values using the round-trip travel times and estimates the distance between each pair of wireless devices based upon the one-way time-of-flight values.

In one embodiment, a position location method is disclosed. The method includes selecting a number of coordinates for defining the position of one or more wireless devices and forming a group of wireless devices in which the number of devices varies according to the number of coordinates selected. The method includes obtaining range measurements for each combination of two wireless devices in the group of wireless devices and position data for a first wireless device in the group of wireless devices. The method further includes determining a position for at least one wireless device other than the first wireless device based on the position data and the range measurements.

In one embodiment, a position location apparatus is disclosed. The apparatus includes means for defining a group of at least four wireless devices. The apparatus also includes means for obtaining a position of a first wireless device in the group of wireless devices and means for obtaining range measurements for each pair of devices in the group of wireless devices. The apparatus further includes means for determining a position for at least one wireless device in the group of wireless devices other than the first wireless device based upon the position of the first wireless device and the range measurements.

In one embodiment, a computer-readable medium carrying one or more sequences of one or more instructions for locating the position of wireless devices is disclosed. The one or more sequences of one or more instructions include instructions which, when executed by one or more processors, cause the one or more processors to perform steps of defining a group of at least four wireless devices, including a first wireless device for which a position is available and second wireless devices for which positions are not available. The instructions cause the one or more processor to obtain range measurements for each pair of wireless devices in the group of at least four wireless devices and to obtaining the position of the first wireless device. The instructions further cause the one or more processors to determine a position of at least one of the second wireless devices using the range measurements and the position of the first wireless device.

BRIEF DESCRIPTION OF THE DRAWINGS

The features, objects, and advantages of embodiments of the disclosure will more apparent from the detailed description set forth below when taken in conjunction with the drawings, in which like elements bear like reference numerals.

DETAILED DESCRIPTION OF EMBODIMENTS OF THE INVENTION

Figure 1:
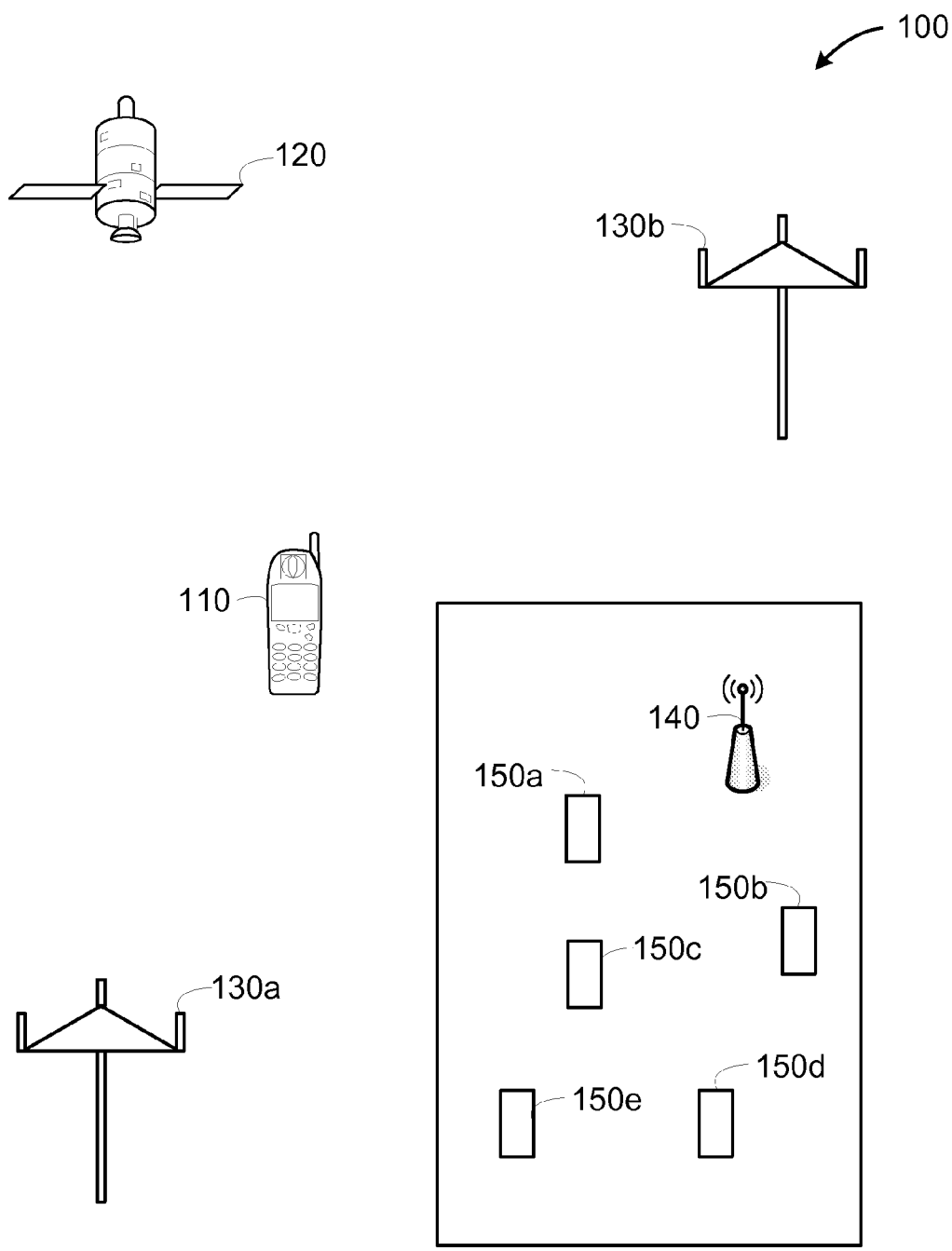
FIG. 1 is a simplified block diagram depicting one embodiment of a position location system.

FIG. 1 is a simplified block diagram of a position location system 100 according to one embodiment of the present invention. Positioning or geo-location a process of determining the coordinates of an object on or near the surface of the earth. These coordinates can be expressed in either two or three dimensions. With location system 100, the position of one or more wireless devices is determined by using a known position of a single wireless device.

Mobile station (MS) 110 is a wireless device capable of determining its own position. For example, MS 110 can include a cell phone, navigation system, personal computing device, personal digital assistant, asset tracker, or other wireless communication device. MS 110 can exchange voice and data signals with other devices using any number or combination of communication standards (e.g., GSM, CDMA, WCDMA, OFDM, GPRS, EV-DO, WiFi, WiMAX, 802.xx, UWB, satellite, etc).

MS 110 can position locate in one or more different ways. For example, as shown, mobile station 110 measures ranges from a group of satellites such as satellite satellite 120 can be part of a satellite-positioning system (SPS) such as the Global Positioning System (GPS), Galileo, GLOSNASS, EGNOS, and the like. Using the known position of SPS satellites and the timing of their respective signals, MS 110 can determine its own position.

MS 110 can also determine its position using terrestrial technologies or a combination of earth-based and satellite-based systems. As shown, MS 110 communicates with one or more base stations 130. Base stations 130, for example, form range estimates using time of arrival (TOA), angle of arrival (AOA), time difference of arrival (TDOA) and related techniques for signals received from MS 110. By combining their known locations with these range estimates, base stations 130 can fix a position for mobile station 110. In some embodiments, MS 110 determines its position using a combination of satellite and terrestrial measurements, such as with assisted GPS and similar technologies.

Access point 140 and user terminals 150 are wireless devices for which a position is not known. For purposes of discussion, it is assumed that access point 140 and user terminals 150 lack the ability to determine their own position. However, it will be recognized that these devices may be temporarily unable to determine their positions due to obstructions or insufficient positioning base stations and/or satellites. As shown, access point 140 and user terminals 150 are located within a building or other structure and can freely change positions.

User terminals 150 are wireless devices which have a networking capability and which can communicate with mobile station 110. For example, user terminals 150 may include cellular telephones, personal digital assistants, portable computing devices, and the like. Access point 140 may be a WiFi or WiMAX capable device which provides user terminals 150 and MS 110 with access to resources on a local or wide area network. In addition to WiFi and WiMAX networking, mobile station 110 and user terminals 150 can exchange messages as part of a dynamic ad hoc or wireless mesh style network. Network communication between devices may also include personal area networks such as Ultra Wideband (UWB), ZigBee, or Bluetooth. In one embodiment, user terminals 150 are cellular telephones which form a homogeneous network for communicating with mobile station 110 as well as with base stations 130.

Wireless devices 110, 140, 150 exchange ranging signals with each other. Ranging signals typically identify the transmitting device, for example, by a network address or other identifier and can be used to measure the time of flight between two wireless devices. Time-of-flight (ranging) measurements can include a round-trip time for signals exchanged by a pair of wireless devices.

Round-trip time between two devices can be obtained where one device sends a request message and the receiving device immediately sends a response message. The sending device measures the time elapsed between sending the request and receiving the response to determine the round-trip travel time. In some embodiments, the round-trip travel time is converted into a one-way time-of-flight for signals traveling between the two devices. The one-way time-of-flight, in turn, can be multiplied by the speed of light to obtain an estimate of the distance between the devices.

Additional information may be included with the ranging signals. For example, wireless devices 110, 140, 150 may include information about the time required to send or otherwise process ranging information. This information can be used to correct the one-way or round-trip time by, for example, deducting the time required for signal processing thereby improving the distance estimate. Also, to improve time resolution, high-bandwidth signals are preferred for ranging. Thus, in some embodiments, wireless devices 110, 140, and 150 include UWB transceivers or similar ranging capabilities.

Position location system 100 uses the known position of mobile station 110 and ranging measurements for pairs of wireless devices 110, 140, 150 to determine a position for one or more of access point 140 and user terminals 150. In one embodiment, a group of wireless devices is first defined for positioning purposes. The group includes a device with known position and a plurality of position-unaware wireless devices. For example, the group of wireless devices might include mobile station 110 together with user terminals 150a, 150b, and 150c making a total of four wireless devices. Mobile station 110 could be a GPS-enabled personal digital assistant, whereas user terminals 150a, 150b, and 150c could be position-unaware cellular telephones.

Continuing with the above example, one device in the group of four devices coordinates the position location determination. In the case of an ad hoc network, each device in the group might announce its existence and capabilities when joining the network. Thus, MS 110 could announce that it is position-aware and that it can communicate with user terminals 150a, 150b, and 150c. Acting as coordinator, user terminal 150c could initiate position location processing for the group by sending ranging signals to one or more devices in the group of four wireless devices. Ranging signals are sent between devices in the group until a range measurement (e.g., one-way time-of-flight or round-trip time) is determined for each pair of devices. Note that it is not necessary for each device to transmit its own ranging signal. Based upon its particular capabilities, a wireless device 110, 150a, 150b, 150c may send a request, or a response, or both so long as a range measurement for each pair of devices in the group is obtained.

Coordinating user terminal 150c obtains the range measurements for the pairs of devices and the position of mobile station 110. Using this information, user terminal 150c can determine its own position and the position of user terminals 150a and 150b. Depending upon the application, user terminal 150c may communicate position data to user terminals 150a, 150b or report their positions to a central server. In the emergency context, for example, reporting the position to each user terminal may enhance the effectiveness of E911 and other position-critical emergency services. On the other hand, reporting device location to a central server improves asset-tracking capabilities. It will be understood that this process of position determination can be continued group-by-group through a large cluster of wireless devices such that, as each device acquires its own position, it can function like MS 110 in the initial positioning stage. It will also be noted that only one position-aware device is utilized in determining positions for a plurality of position-unaware devices.

In some embodiments, each wireless device coordinates its own position location processing and may or may not share positioning data with other devices. For example, in an ad hoc network environment, a decentralized approach call be used. In this case, each wireless device 110, 150 announces its capabilities to other networked devices. Individual wireless devices then define positioning groups of wireless devices within their respective communication ranges from which sufficient positioning data can be obtained. Mobile station 110, for example, knows its own position and thus can form a group including at least three user terminals 150 from which to obtain range measurements. User terminals 150, on the other hand, are not position-aware and thus define their respective positioning groups to include a wireless device for which position data is available such as mobile station 110. Thereafter, each wireless device 110, 150 obtains position data and range measurements from the wireless devices in its respective positioning group and determines its own position based upon the data collected.

Figure 2A:
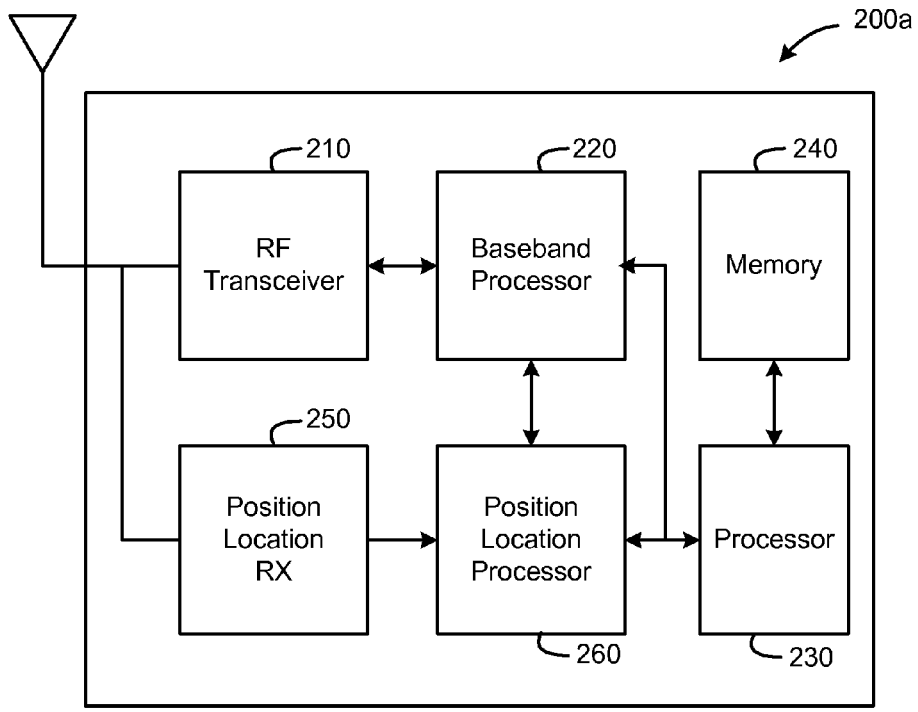
FIGS. 2A-2B are functional block diagrams of embodiments of wireless devices used in a position location system.

FIG. 2 is a block diagram of a wireless device 200a in accordance with embodiments of the present invention. Wireless device 200a can be, for example, one of user terminals 150, access point 140, and mobile station 110 depicted in FIG. 1. On its receive path, wireless device 200a receives a radio frequency signal at RF transceiver 210. RF transceiver 210 demodulates the received RF signal and delivers it to baseband processor 220. Baseband processor 220 extracts information from the demodulated signal and delivers it either to position location processor 260 or to processor 230. Received voice and data signals, for example, are directed to main processor 230 where they may, for example, undergo further processing or be presented at a user interface. Ranging signals, on the other hand, may be directed to position location processor 260.

On the transmit path, baseband processor 220 receives transmit data from processor 230 and forms a baseband signal. RF transceiver 210 receives the baseband signal and uses it to modulate the RF transmit signal. As shown, processor 230 accesses memory 240 to store and retrieve data and instructions. In some embodiments, processor 230 receives output from position location processor 260 and may directly or indirectly control its operations. For example, processor 230 may support position location processor 260 by executing one or more sequences of one or more instructions stored in memory 240 which may be called from position location processor 260.

Wireless device 200a can also include position location receiver 250. Position location receiver 250 can be a GPS radio or similar hardware for use with a satellite positioning system. If present, position location receiver 250 provides position data such as coordinates in two or three dimensional space for use by position location processor 260.

Position location processor 260 coordinates position determination for a group of wireless devices. Using range measurements for each pair of devices in the group, together with position data for one device in the group, position location processor 260 determines a position for one or more of the position-unaware devices as desired. Position data may be obtained from position location receiver 250 or, if unavailable, it can be obtained from an external source. Position location processor 260 sends position data to one or more devices in the group of wireless devices, in this way, among other applications, position-unaware devices acquire their own positions, the position of the wireless devices can be tracked by a central server, or both.

Figure 2B:
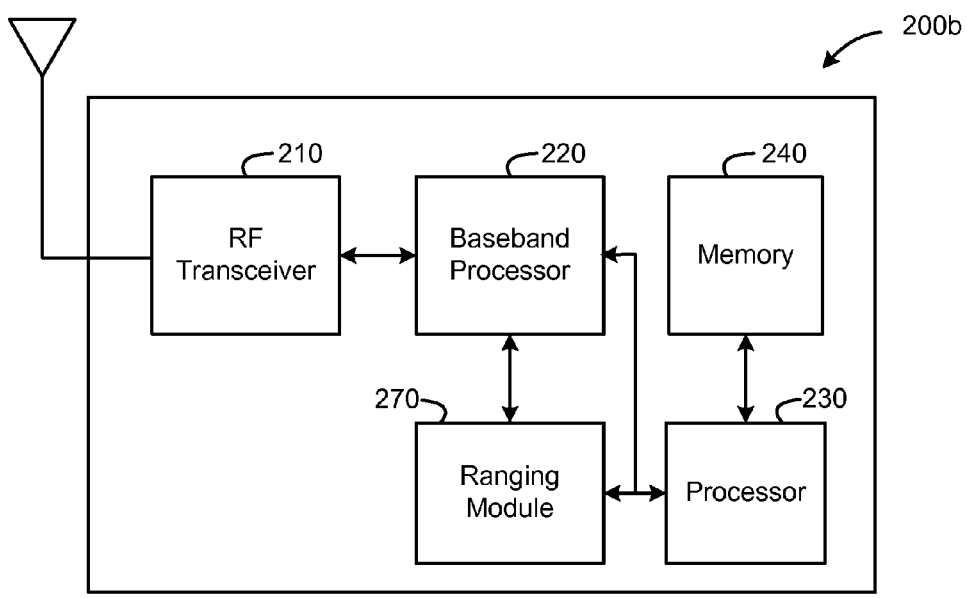

FIG. 2B shows a further embodiment of a wireless device 200b such as can be used in position location system 100. Unlike the wireless device depicted in FIG. 2A, wireless device 200b does not include position location processor 260. Instead, wireless device 200b includes ranging module 270. Ranging module 270 enables wireless device 200b to send ranging signals to other devices and to respond to ranging signals from other devices. Thus, wireless device 200b uses ranging module 270 to obtain range measurements and to assist other wireless devices to do the same. RF transceiver 210, baseband processor 220, and memory 240 perform functions similar to those described in connection with FIG. 2A.

In one embodiment of position location system 100, each user terminal 150 is a wireless device such as wireless device 200b. In this arrangement, range measurements obtained by user terminals 150 in a group of devices may be communicated to another device for position location processing. As an example, access point 140 may form a group of wireless devices including mobile station 110 and user terminals 150a, 150b and 150c in this example, it is assumed that none of the devices in the group has a position location processor 260, but that mobile station 110 has the capability to determine its own position as previously described.

Continuing with the example, wireless devices 110, 150a, 150b, 150c cooperate to obtain range measurements so that at least one range measurement is available for each pair of devices in the group. At each device, for example, processor 230 causes ranging module 270 to either initiate a ranging signal or to respond to a ranging signal from another device in the group. Range measurements for the group of devices can be passed from one device to the next or returned directly to access point 140. The known position of mobile station 110 can be provided to access point 140 in a similar manner.

When access point 140 has received the complete set of range measurements and the known position data, it can determine one or more positions on behalf of the group. Thus, access point 140 can remotely determine a position for user terminals 150a, 150b, and/or 150c. In this way, wireless device 200b participates in the position location process but with potentially reduced processing capabilities permitting a device which may have a more powerful processor (such as access point 140) to perform more computationally demanding position location tasks.

Figure 3A:
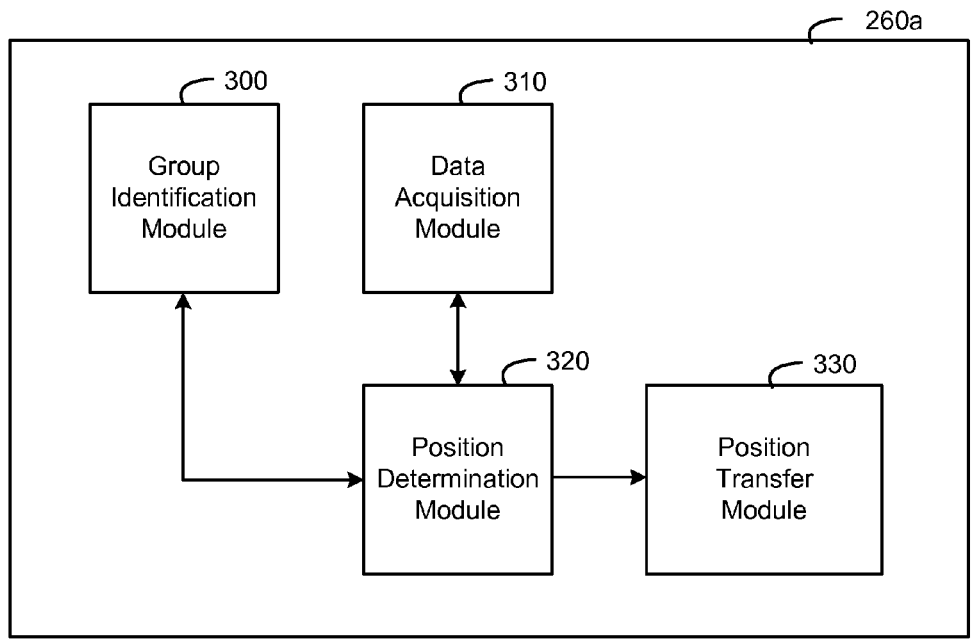
FIGS. 3A-3B are functional block diagrams of embodiments of a position processor used in a wireless device.

FIG. 3A is a functional block diagram of a position location processor 260a such as can be used with embodiments of wireless device 200a. Position location processor 260a is shown as including group identification module 300, data acquisition module 310, position determination module 320, and position transfer module 330.

Group identification module 300 defines a group of wireless devices for position location processing. This process can include obtaining a network address or other identifier for at least one device with a known position and a plurality of devices whose positions are not known. In an ad-hoc networking context, group identification module 300 can verify the capabilities of each wireless device, including its ability to communicate with other wireless devices in the group. In some embodiments, the number of wireless devices in the group varies according to the number of coordinates used to specify a position in the system. In an exemplary embodiment, group identification module 300 forms a group of at least four wireless devices for determining two-dimensional coordinates and at least six wireless devices in the case of three-dimensional positioning.

Data acquisition module 310 obtains range measurements and position data for the group of devices. The range measurements and position data are used by position determination module 320 to fix a position for one or more of the wireless devices in the group. Data acquisition module 310 obtains a range measurement for each pair of devices either passively, in the case of receiving a ranging measurement from another device, or actively by sending ranging signals to another device. Exemplary data obtained by acquisition module 310 will now be discussed with reference to FIG. 4.

Figure 4:
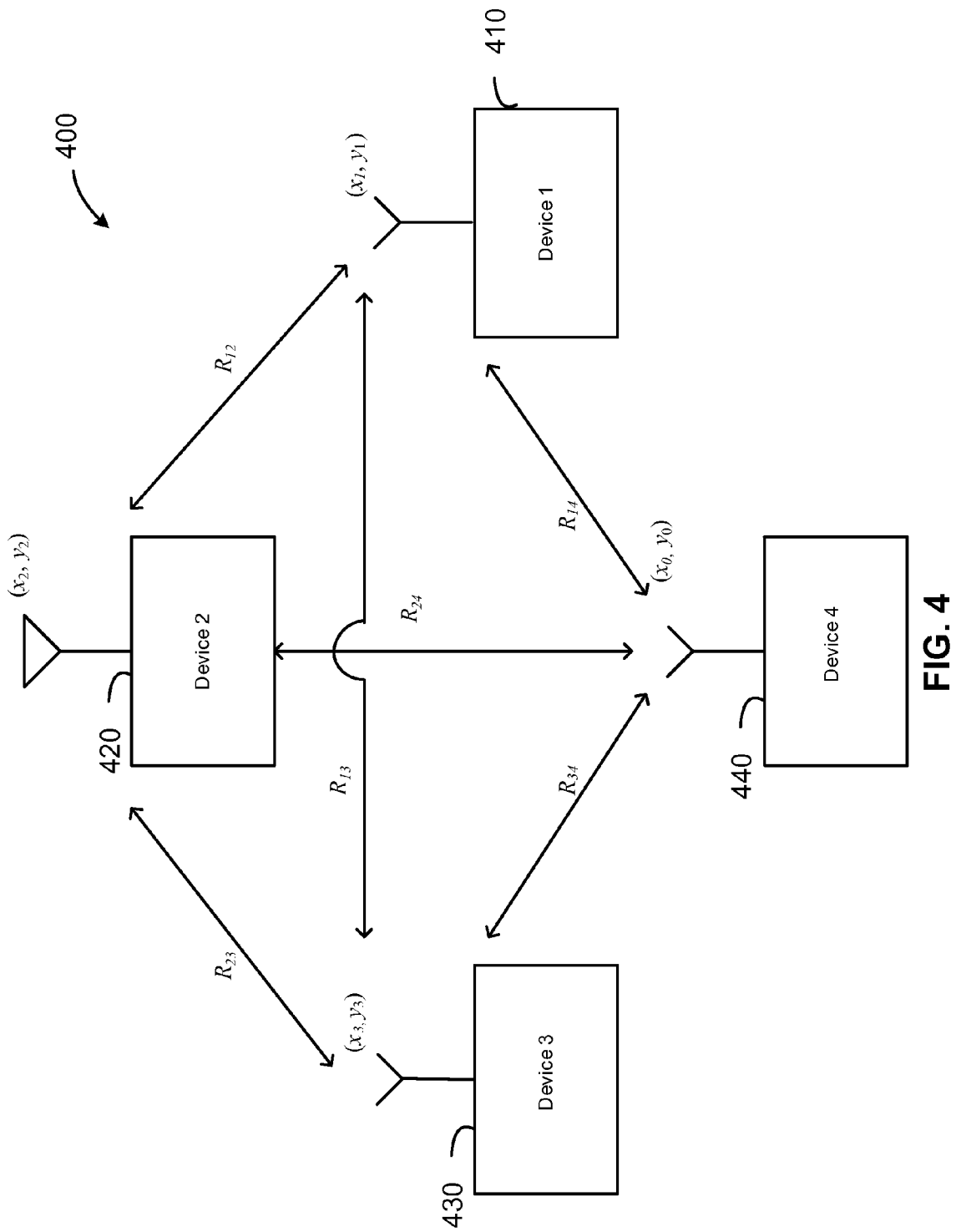
FIG. 4 shows an example of position location processing.

FIG. 4 shows a group of four wireless devices 410-440 such as might be used to determine two-dimensional coordinate pairs. In the figure, device 440 has known position $(x_0, y_0)$ whereas devices 410, 420, and 430 have unknown positions $(x_1, y_1)$, $(x_2, y_2)$, and $(x_3, y_3)$ respectively. Device 420 coordinates position determination for the group of wireless devices. As such, device 420 can include wireless device 200 and, in particular, position location processor 260.

Data acquisition module 310 obtains range measurements for each pair of devices in the group defined by identification module 300. Put another way, data acquisition module 310 obtains range measurements for each combination of devices selected two at a time from the group of N wireless devices. This can be represented mathematically as $C_2^N$. As shown in FIG. 4, there are a total of six combinations for a group of four wireless devices ($C_2^4=6$). Thus, acquisition module 310 obtains a total of six range measurements. For a group of six wireless devices, such as might be used with three-dimensional positions, data acquisition module 310 obtains a total of 15 range measurements.

When acquisition module 310 has obtained the set of range measurements for the group of wireless devices 410-440 and the known position $(x_0, y_0)$ of device 440, it this data to position determination module 320. In some embodiments, determination module 320 checks the data against a group definition supplied by identification module 300 to ensure that the complete set information is available. Once data acquisition is complete, determination module 320 begins the process of determining a position for one or more of wireless devices 410, 420, 430.

Initially, if needed, range measurements are converted into distances. Thus, for example, round-trip travel measurements may be divided by two and then adjusted for the processing time of the receiving device. One-way time-of-flight values may be calculated from range measurements and then converted. The adjusted range measurements are then multiplied by the speed of light to arrive at a distance estimate. As shown in FIG. 4, the distance between each pair of devices is represented as $R_{ij}$, where i and j represent different wireless devices in the group. In some cases, distance value are obtained from acquisition module 310 so that no conversion is necessary.

Following the conversions, position determination module 320 uses the values and the known position data to calculate a position for one or more of devices 410, 420, and 430. In one embodiment, position determination module 320 uses the Pythagorean theorem to express the distance between each pair of wireless devices in the defined group as being equal to the distance value determined from the range measurements. An exemplary form of the distance equation for two dimensional coordinates (x,y) is set forth in equation (1) below.

$$\sqrt{(x_j - x_i)^2 + (y_j - y_i)^2} = R_{ij}, \quad (1)$$
$$i, j = 0, \ldots 3, i \neq j$$

It will be noted that for the group of wireless devices 410-440, there are six equations in six unknowns. Thus, the system can be efficiently solved for all or some of the two dimensional coordinates using a variety of numerical methods. For three-dimensional positioning, this approach requires range measurements for a group of six wireless devices in addition to a position for one of the wireless devices. In that case, the number of range measurements is 15 ($C_2^6=15$) and thus there are 15 equations in 15 unknowns.

The non-linearity of equation (1) results in two positions for each wireless device. In some embodiments, position determination module 320 uses one or more heuristic measures to select a position for a wireless device from among the possibilities. In the case of three dimensional positioning, for example, determination module 320 may reject positions that are below the earth's surface. Position data may also be validated by comparing it with one or more reference points. For example, an access point or similar device may be programmed with the coordinates of the building in which it is located and may share this information with networked devices. In such case, determination module 320 may reject positions that are determined to be outside of the building's perimeter. Position data can also be validated based upon the visibility of other devices. For example, using a so-called sectorized approach, position data for one device call be validated based upon that device's ability (or inability) to communicate with a third device having a known communication range. Many other position validation schemes are possible and within the scope of the present invention.

After a unique position has been determined for one or more of wireless devices 410-430, position determination module 320 delivers the position data to transfer module 330. Position transfer module 330 can send position data to each wireless device so that, in this way, the wireless device acquires its own position and possibly the position of surrounding devices. Similarly, position transfer module 330 can send one or more network messages with position data to a network server or other data processor.

Figure 3B:
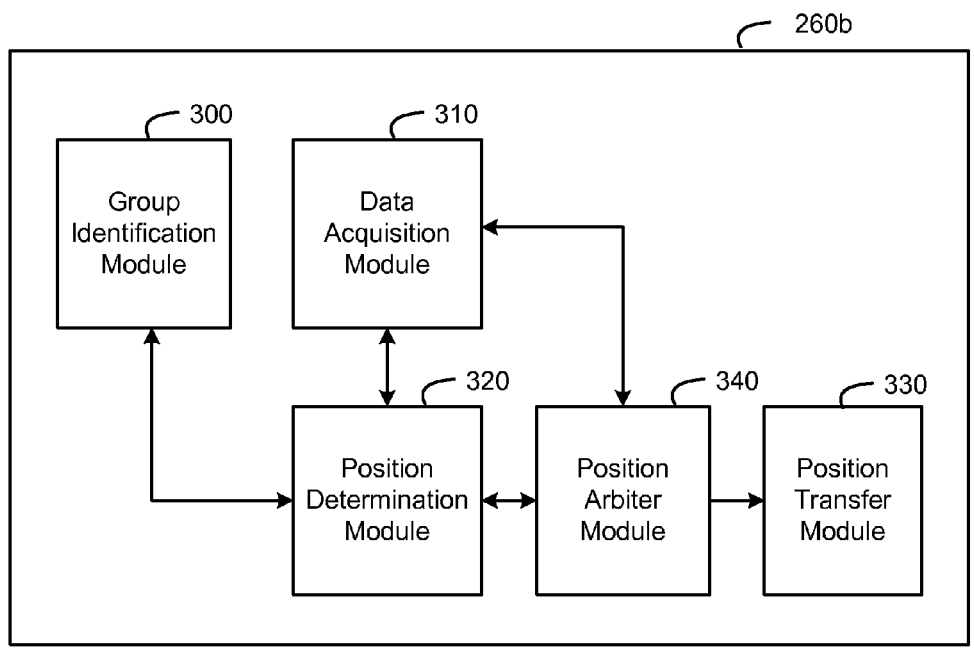

FIG. 3B is a functional block diagram of a position location processor 260b according to another embodiment of the present invention. As shown, location processor 260b includes position arbiter module 340 in addition to the modules discussed in connection with FIG. 3A. Position arbiter module 340 discriminates among the positions calculated by position determination module 320. It thus replaces or supplements the heuristics employed by position determination module 320 in order to establish position data for one or more of the wireless devices in the group defined by identification module 300. The operation of position arbiter module 340 is now discussed with reference to FIGS. 2, 3B, and 5.

Figure 5:
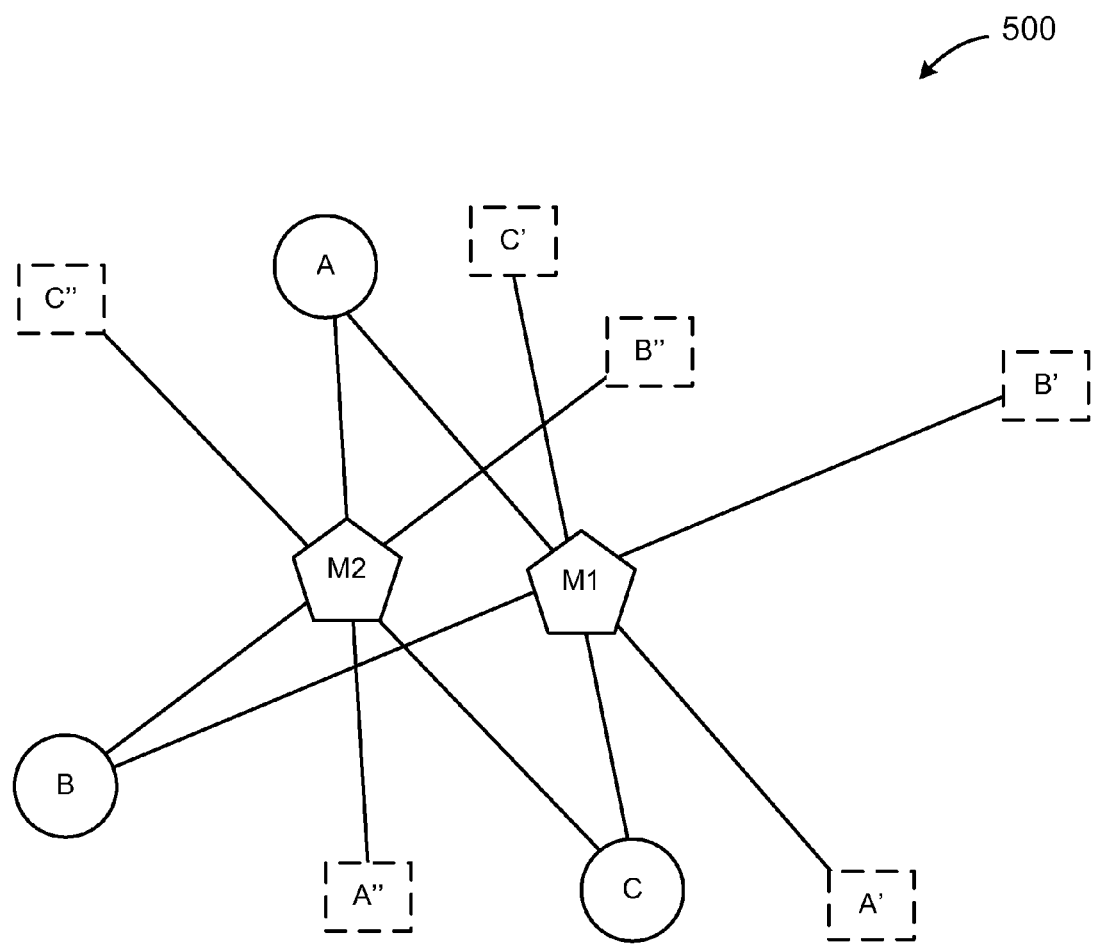
FIG. 5 shows a further example of position location processing.
Figure 5:
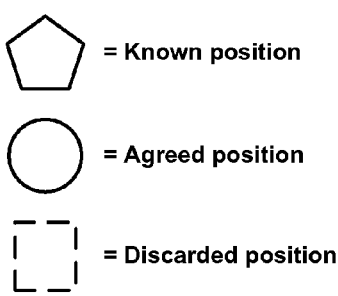

FIG. 5 shows two devices M1, M2 interacting to determine the position of each wireless device A, B, and C from among possible positions for those devices. Devices M1, M2 may be wireless devices 200b and one or both may include position location processor 260 with position arbiter module 340. For clarity, the following discussion assumes that device M1 includes position arbiter module 340 and that it determines a final position for devices A, B, and C.

Initially, device M2 defines a group of wireless devices including M2, A, B, and C and obtains a complete set of ranging measurements for each pair of devices in its group. Device M2 has a known position and determines position data for one or more of the devices in its group using its position and the ranging measurements. For this example, M2 determines two possible coordinate pairs for locating each of devices A, B, and C. These include {A, A"}, {B, B"}, and {C, C"}.

Device M1 defines a second group of wireless devices for position location determination including M1, A, B, and C. In similar fashion, M1 obtains a complete set of ranging measurements for the devices in the second group, combines the ranging measurements with its known position, and determines two possible coordinate pairs for each of devices A, B, and C. These possible positions include {A, A'}, {B, B'}, and {C, C'}. Although not drawn to scale, the distance between devices M1 and M2 and their respective two possible coordinate pairs for each of devices A, B, and C can be substantially the same. For example, if a set of distance equations having the form of equation (1) is solved, the distance between device M1 and possible position {B} will be substantially the same as the distance between device M1 and possible position {B'}. Similarly, the distance between device M2 and possible position {A} will be substantially the same as the distance between device M2 and possible position {A"} in the solution to the set of distance equations.

In one embodiment, M1 position arbiter module 340 directs its data acquisition module 310 to request positioning data for wireless devices A, B, and C. For example, in an ad hoc networking environment, acquisition module 310 may send a broadcast message to the network requesting positioning data for devices A, B, and C. Alternatively, acquisition module 310 may send a broadcast message announcing that it has positioning data for device A, B, and C. In another embodiment, devices M1 and M2 may act in concert such that device M2 automatically provides its positioning data to device M1 without there being a network request or announcement message.

Device M2 has positioning data for each of devices A, B, and C. Accordingly, at device M1, data acquisition module 310 can acquire one or more of these positions from device M2 and present them to position arbiter module 340. Position arbiter module 340 can select a position for one or more of devices A, B, and C from among the data provided by position determination module 320 and data obtained from device M2 through acquisition module 310. In one embodiment, position arbiter module 340 selects the position that is agreed to by both devices M1, M2.

For example, due to the non-linearity of the distance equations, M1 position determination module 310 indicates that device A could be located either at position A or at position A'. However, the data obtained from device M2 indicates that device A could be at either position A or at position A". Since both coordinating devices agree upon position A, position arbiter module 340 provides position A to transfer module 330 as the final position of device A. Similarly, device M1 and M2 agree upon position B and position C for devices B and C, respectively. Thus, these positions are selected and the remaining possibilities can be discarded or stored for use in subsequent position location activities.

Although devices M1 and M2 are described as coordinating the positioning process, it will be recognized that any one of the relevant devices can function in this manner. For example, device B could define a first position determination group including devices A, B, C, and M1 and could also define a second group including devices A, B, C, and M2. In this case, device B's position location processor 260 would generate two sets of position data for each of devices A, B, and C. The first set of positions would be determined from the set of ranging measurements for the first group and the known position of device M1. The second set of positions would be based upon the ranging, measurements for the second group and the known position of device M2. Device B's position arbiter module 340 would then make an appropriate position determination based upon the sets of data.

Figure 6:
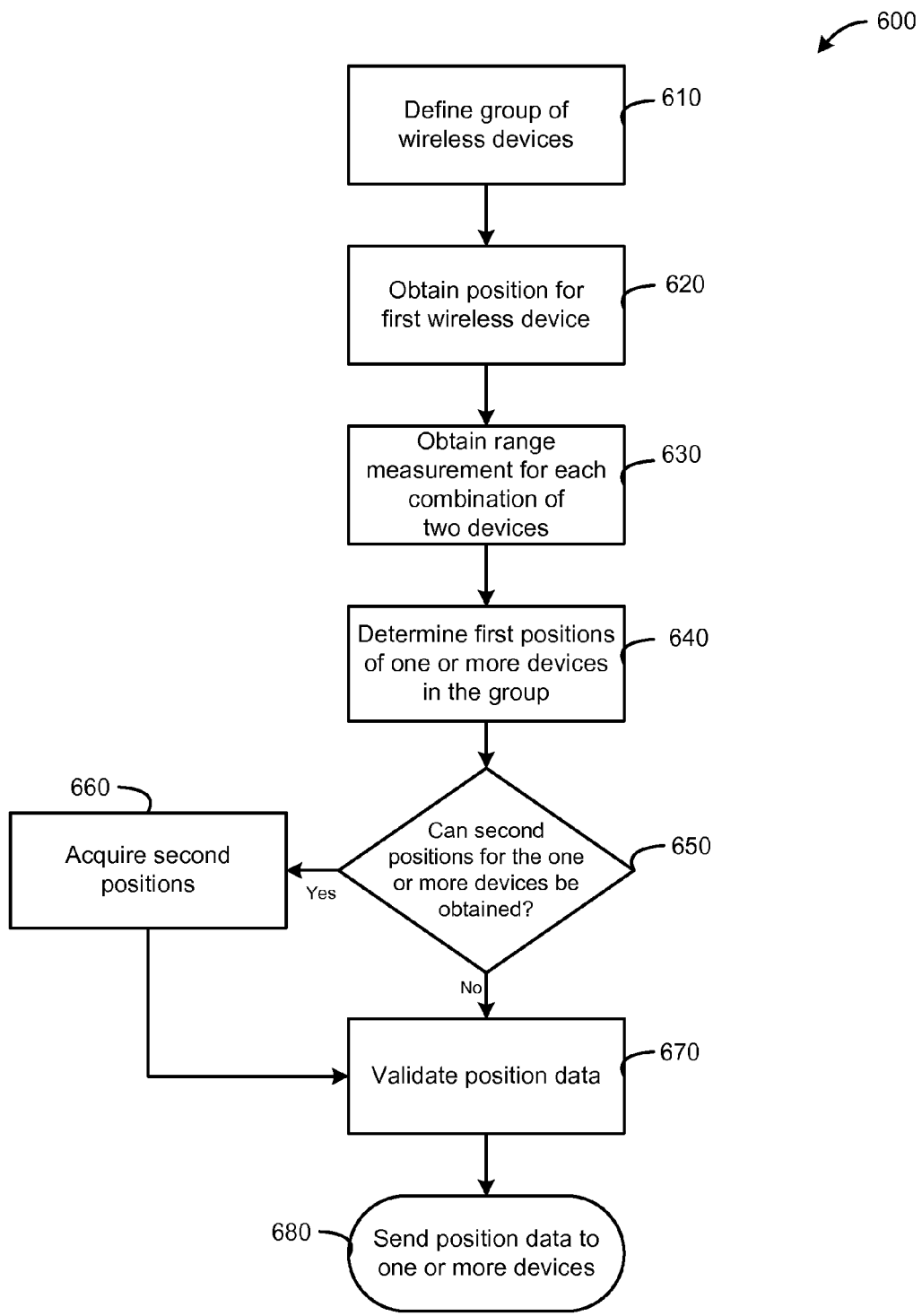
FIG. 6 is a flowchart of an embodiment of a position location method.

FIG. 6 is a flowchart of a position location method 600 according to one embodiment of the present invention. The method 600 can be performed by a coordinating device such as one of the user terminals 150, access point 140, and mobile station 110 as shown in FIG. 1.

At block 610, a group of wireless devices is defined for position location processing. The number of devices in the group can vary according to the number of coordinates used to specify a wireless device's position. For example, if two dimensional positioning is selected, the group may contain four or more wireless devices. On the other hand, a group of six or more wireless devices may be used to determine coordinates in three dimensions.

The position of one wireless device in the group is obtained at block 620. In one embodiment, the group of wireless devices includes only one device having a known position. If the coordinating device is also the position-aware device, then it can acquire its own position via a satellite or terrestrial positioning system. Otherwise, the coordinating device obtains the position directly or indirectly from the position-aware device in the group of wireless devices.

At block 630, range measurements are obtained for each combination of two devices in the group of wireless devices defined at block 610. Range measurements can be indicative of time or distance values. Time values can include, for example, one-way time-of-flight and round-trip travel times between a pair of devices and may include pseudo-ranges and/or values that have been adjusted to a common time-base. In some cases, time values are converted into distances by multiplying them by the speed of light. More generally, at block 630, information is obtained from which the distance between each device pair can be determined.

When the known position and range data have been obtained, first positions for one or more of the position-unaware devices in the group are determined at block 640. This can involve various numerical methods implemented in hardware and software which may yield more than one result due to non-linearity of the positioning equations. If more than one position for a wireless device is determined, the position data is validated in subsequent processing.

At decision block 650, a determination is made regarding the availability of second positions for the one or more wireless devices. This may include, for example, sending a network message requesting possible positions for specific wireless devices or monitoring network traffic to detect whether another device may have some or all of the desired information. For example, another device may have position estimates for one or more of the devices which could be validated by comparing them with the first positions determined at step 640. In some embodiments, method 600 is performed independently by two devices which then cooperate to exchange the positioning data determined by each. Thus, processing at decision block 650 may also include supplying the first positions determined at block 640 to another device.

If position data is available for the one or more devices for which first positions were determined, it is acquired at block 660. At block 670, the position of the one or more devices is validated. If second positions were acquired at block 660, the position data can be validated by comparing the first positions with the second positions. A match, for example, can be used to select a final position for the one or more wireless devices. Alternatively or additionally, the position data can be validated with reference to secondary information. For example, positions that are below the earth's surface or outside of an enclosed space can be rejected as previously noted. At block 680, final positions are sent to one or more devices. This can include notifying, a device of its own position as well as tracking the device's position as part of a larger system.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

A software module may reside in RAM memory, flash memory, non-volatile memory, ROM memory, EPROM memory, EEPROM memory, registers, hard disk, a removable disk, a CD-ROM, or any other form of physical storage medium known in the art. An exemplary storage medium is coupled to the processor such that the processor can read information from, and write information to, the storage medium. In the alternative, the storage medium may be integral to the processor.

The steps of a method, process, or algorithm described in connection with the embodiments disclosed herein may be embodied directly in hardware, in a software executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. An apparatus comprising:
   a memory; and
   a processor to:
   define a group of at least four wireless devices, including a first wireless device for which a known position according to a frame of reference is available and second wireless devices for which positions according to the frame of reference are not available;
   obtain range measurements for each pair of wireless devices in the group of at least four wireless devices, the range measurements indicating a range between the wireless devices of each pair, wherein the range measurements for each pair are based at least in part on one or more measurements of a signal transmitted from a transmitting wireless device of the pair to a receiving wireless device of the pair;
   estimate a position according to the frame of reference of at least one of the second wireless devices based at least in part on the obtained range measurements and the known position of the first wireless device; and
   store at least the known position of the first wireless device in the memory.

2. The apparatus of claim 1, wherein the processor is further capable of sending the estimated position of the at least one of the second wireless devices to the at least one of the second wireless devices.

3. The apparatus of claim 1 wherein the range measurements comprise a round-trip time for signals exchanged by each pair of wireless devices.

4. The apparatus of claim 1, wherein the processor is further capable of converting the range measurements into one-way time-of-flight values for signals traveling between each pair of wireless devices.

5. The apparatus of claim 1, wherein the processor is further capable of processing a set of non-linear equations to estimate the position of the at least one of the second wireless devices.

6. The apparatus of claim 1, wherein the processor is further capable of selecting the position of the at least one of the second wireless devices from a set of estimated positions.

7. The apparatus of claim 6, wherein the processor is further capable of:
   obtaining second positions for the at least one of the second wireless device; and
   estimating the position of the at least one of the second devices based at least in part on the second positions and the set of estimated positions.

8. The apparatus of claim 1 wherein the position of the at least one of the second wireless devices comprises two-dimensional coordinates.

9. The apparatus of claim 1 wherein the position of the at least one of the second wireless devices comprises a coordinate in three dimensional space, and wherein the group of wireless devices comprises at least six wireless devices.

10. A method comprising:
    defining, by a processor, a group of at least four wireless devices, including a first wireless device for which a known position according to a frame of reference is available;
    obtaining range measurements for each pair of devices in the group of wireless devices, the range measurements indicating a range between the wireless devices of each pair, wherein the range measurements for each pair are based at least in part on one or more measurements of a signal transmitted from a transmitting wireless device of the pair to a receiving wireless device of the pair;

estimating, by the processor, a position according to the frame of reference of at least one of the second wireless devices based at least in part on the known position of the first wireless device and the obtained range measurements; and storing at least the known position of the first wireless device in the memory.

11. The method of claim 10 wherein obtaining range measurements comprises ranging to wireless devices for which a position has not been determined.

12. The method of claim 10, further comprising sending the estimated position of the at least one of the second wireless devices to the at least one of the second wireless devices.

13. The method of claim 10 wherein the range measurements comprise a round-trip time for signals exchanged by each pair of wireless devices.

14. The method of claim 10 wherein obtaining range measurements further comprises calculating a one-way time-of-flight for signals traveling between each pair of wireless devices.

15. The method of claim 10 wherein estimating the position of the at least one of the second wireless devices comprises processing a set of non-linear equations.

16. The method of claim 10 wherein estimating the position for the at least one of the second wireless devices comprises estimating a set of positions and selecting the position for the at least one of the second wireless devices from the set of positions.

17. The method of claim 10 wherein the position for the at least one of the second wireless devices comprises two-dimensional coordinates.

18. The method of claim 10 wherein the position for the at least one of the second wireless devices comprises three-dimensional coordinates and the group of wireless devices comprises at least six wireless devices.

19. The method of claim 10 wherein the first wireless device estimates the position of the at least one of the second wireless devices.

20. The method of claim 10 wherein a device other than the first wireless device determines the position of the at least one of the second wireless devices.

21. The method of claim 10 wherein the first wireless device has a position location capability and other devices in the group of wireless devices do not have a position location capability.

22. The method of claim 21 further comprising:
acquiring second positions for the at least one of the second wireless devices; and
selecting a position for the at least one wireless device from the second positions and the position estimated based at least in part on the known position of the first wireless device and the range measurements.

23. A position location method, comprising:
forming, by a processor, a group of wireless devices in which the number of devices varies according to the number of coordinates selected for defining their respective positions, the group of wireless devices including a first wireless device for which a known position according to a frame of reference is available and second wireless devices for which positions according to the frame of reference are not available;
obtaining range measurements for each combination of two wireless devices in the group of wireless devices, the range measurements indicating a range between the two wireless devices of each combination, wherein the range measurements for each pair are based at least in part on one or more measurements of a signal transmitted from a transmitting wireless device of the pair to a receiving wireless device of the pair;
estimating, by the processor, a position according to the frame of reference for at least one of the second wireless devices based at least in part on the known position and the range measurements; and
storing at least the known position of the first wireless device in the memory.

24. The method of claim 23 further comprising sending the estimated position of the at least one of the second wireless devices to the at least one wireless device.

25. The method of claim 23 wherein the range measurements comprise a round-trip time for signals exchanged by each combination of wireless devices.

26. The method of claim 23 wherein obtaining range measurements further comprises calculating a one-way time-of-flight for signals traveling between each combination of wireless devices.

27. The method of claim 23 wherein the position for the at least one of the second wireless devices of the group of wireless devices comprises three-dimensional coordinates and the group of wireless devices comprises at least six wireless devices.

28. The method of claim 23 further comprising: acquiring second positions for the at least one of the second wireless devices; and
selecting a position for the at least one of the second wireless devices from among the second positions and the position determined using the known position for the first wireless device and the range measurements.

29. A position location apparatus comprising:
means for defining a group of at least four wireless devices, including a first wireless device for which a known position according to a frame of reference is available and second wireless devices for which positions according to the frame of reference are not available;
means for obtaining range measurements for each pair of devices in the group of wireless devices, the range measurements indicating a range between the wireless devices of each pair of devices, wherein the range measurements for each pair are based at least in part on one or more measurements of a signal transmitted from a transmitting wireless device of the pair to a receiving wireless device of the pair; and
means for estimating a position according to the frame of reference for at least one of the second wireless devices based at least in part on the known position of the first wireless device and the range measurements.

30. The apparatus of claim 29, further comprising means for sending the estimated position of the at least one of the second wireless devices to the at least one of the second wireless devices.

31. The apparatus of claim 29, further comprising:
means for acquiring second positions for the at least one of the second wireless devices; and
means for selecting a position for the at least one of the second wireless devices from among the second positions and the position estimated based at least in part on the known position of the first wireless device and the range measurements.

32. An electronic device comprising: a non-transitory computer-readable medium having stored thereon one or more instructions that, if executed by one or more processors, cause the one or more processors to:

define a group of at least four wireless devices, including a first wireless device for which a known position according to a frame of reference is available and second wireless devices for which positions according to the frame of reference are not available;

obtain range measurements for each pair of wireless devices in the group of at least four wireless devices, the range measurements indicating a range between each pair of two wireless devices, wherein the range measurements for each pair are based at least in part on one or more measurements of a signal transmitted from a transmitting wireless device of the pair to a receiving wireless device of the pair; and estimate a position of at least one of the second wireless devices according to the frame of reference based at least in part on the range measurements and the known position of the first wireless device.

* * * * *